Feb. 5, 1952          J. C. BURRIS          2,584,840
DISPLAY DEVICE
Filed April 14, 1949          2 SHEETS—SHEET 2
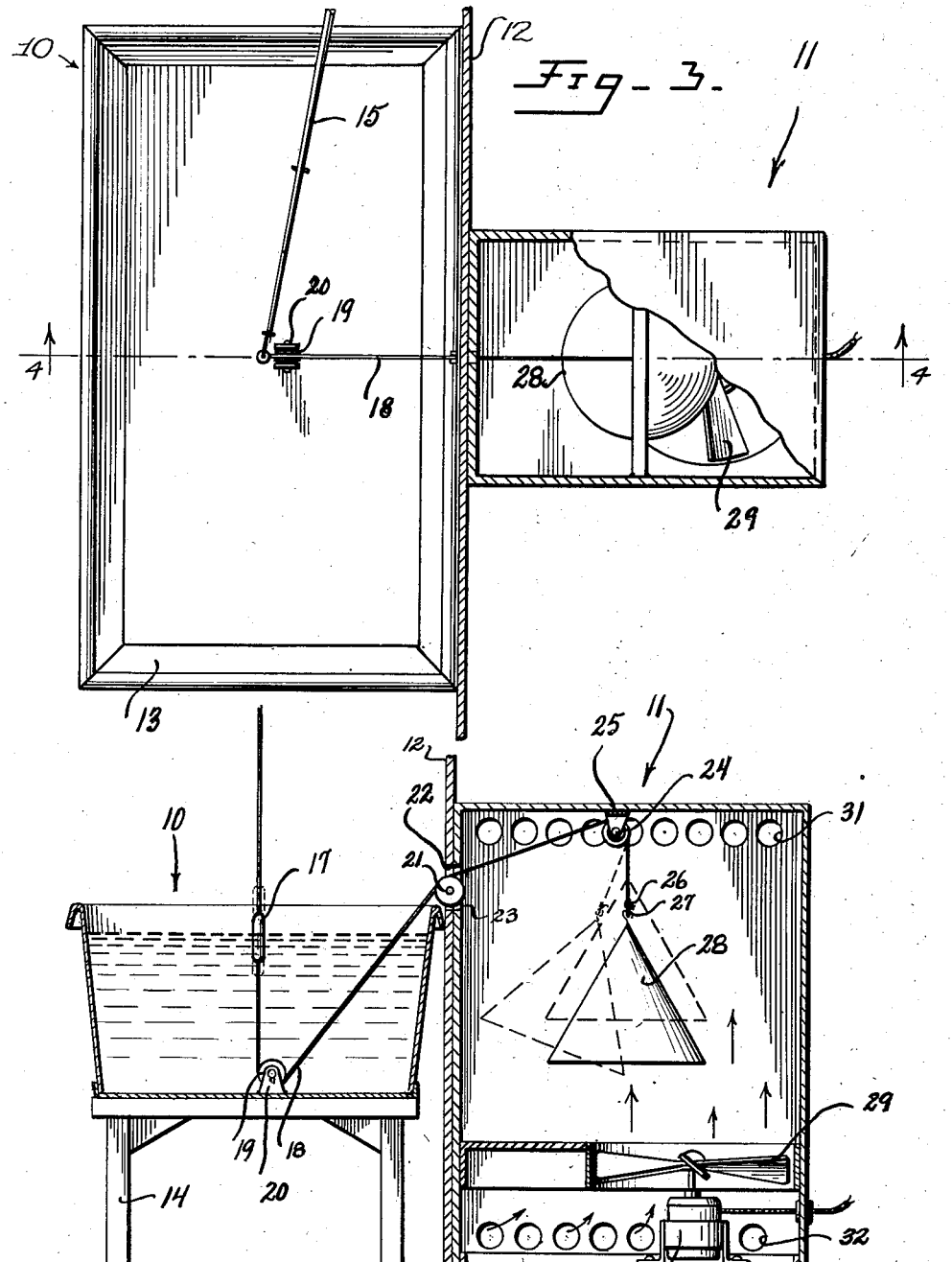
INVENTOR.
J. CLARENCE BURRIS
BY
Jerome W. Payton
Agt.

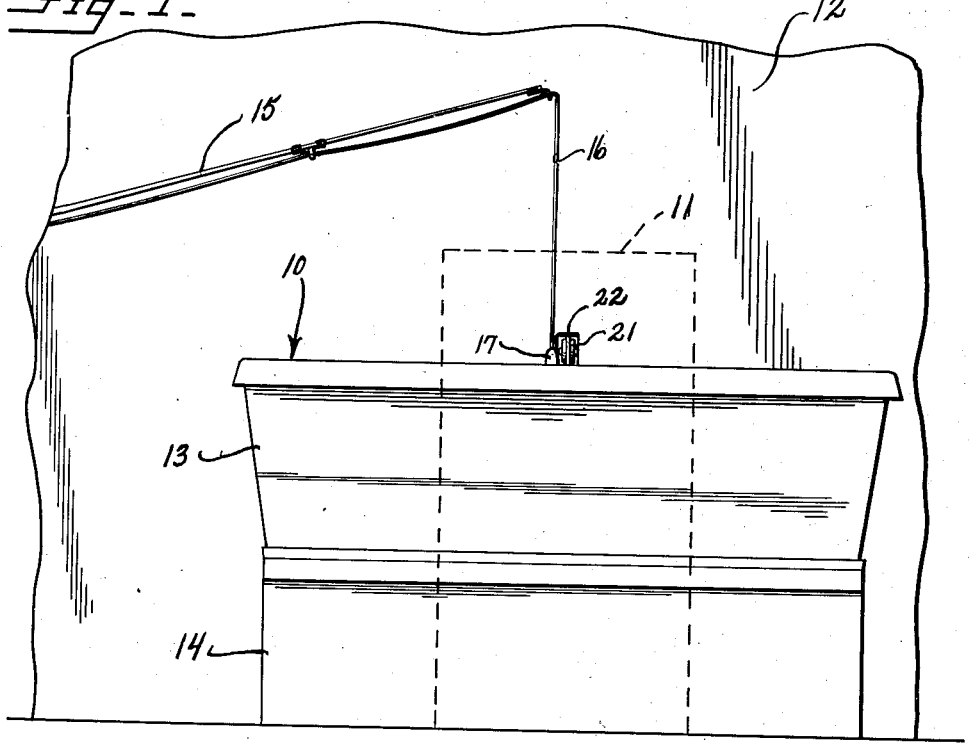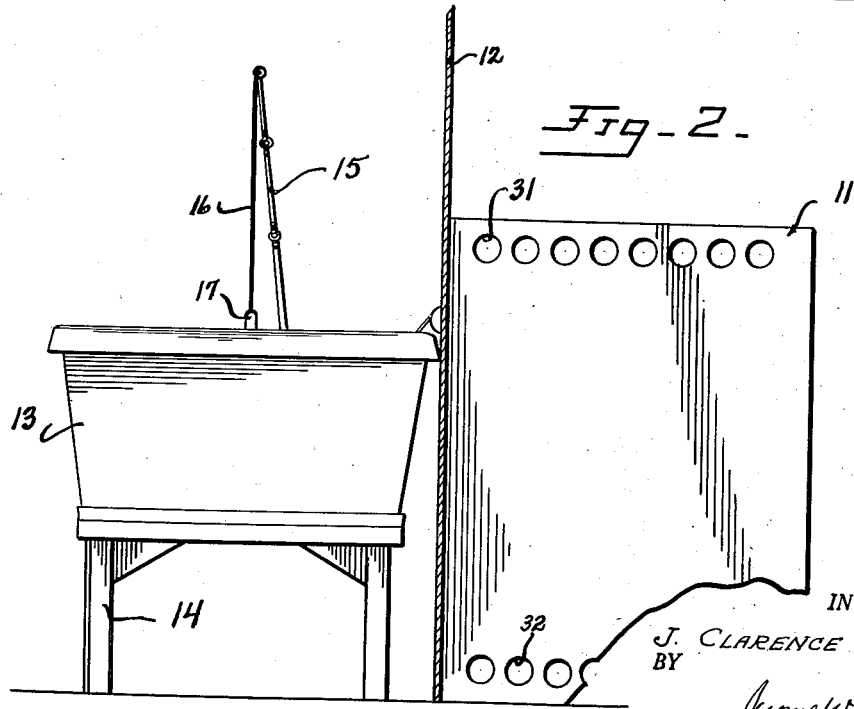

Patented Feb. 5, 1952

2,584,840

UNITED STATES PATENT OFFICE 2,584,840

DISPLAY DEVICE

John Clarence Burris, Mission, Tex.

Application April 14, 1949, Serial No. 87,501

8 Claims. (Cl. 40—37)

The present invention relates to a method and apparatus for providing an attractive movable display, and more particularly has reference to a method and apparatus whereby a realistic simulation of a fish striking a line is effected.

It is, of course, well known that window displays wherein realistic simulations of the merchandise to be sold are particularly attractive, and experience has demonstrated that this is especially true of sporting equipment. I am cognizant of the fact that it has been heretofore proposed to provide a display wherein the cork or bobber attached to a fishing line is pulled under the water level and subsequently released to simulate the striking of the line by a fish. However, such prior displays effect regular even movements of the cork or bobber which, of course, is not the case under actual fishing conditions and hence tends to detract from the realistic effect of the simulation.

Accordingly, a salient object of the present invention is to provide a display of the character described wherein the movements of the cork or bobber are very irregular, thus providing a more realistic movement of the bobber.

Another object of the present invention is to provide a window display of the type above mentioned wherein movement is imparted to the cork or bobber by means of an air current which is located at a point remote from the cork or bobber.

Yet a further object of the present invention is to provide a display device wherein a cork or bobber is attached to a fishing line with an additional line attached to the bobber leading to a cone-like element supported in an off center position with respect to a source of air current whereby the cone may assume different positions relative to the source of air current, thus providing an irregular movement to the cork or bobber.

And still another object of the present invention is to provide a display device for store windows or the like which is simple in structural detail, positive and efficient in operation, and capable of being cheaply and readily manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a front elevational view of a display device constructed in accordance with the present invention;

Figure 2 is an end view of the device shown in Figure 1 and being partly in cross section.

Figure 3 is a top plan view of the device shown in Figures 1 and 2 and being partly in cross section.

Figure 4 is a vertical sectional view taken along the line 4—4 of Figure 3, looking in the direction of the arrows.

Referring to the drawings, and more particularly to Figures 2 and 3, the invention broadly includes an exterior or visible member 10 and a concealed member or housing 11 mounted rearwardly thereof, the units being separated by a vertical partition or the like 12. The exterior member 10 includes a tank 13 of any suitable size, material or shape supported by a table or other base 14. It is to be understood, of course, that the tank 13 and the panel 12 are to be camouflaged with artificial or natural grass, shrubs, trees and the like to provide a scene or background simulating a stream or other fishing habitat, and it is thought that such camouflage will be readily apparent to one skilled in the art. A fishing pole 15 projects over the tank 13 and the free end may be supported by a dummy fisherman or in some other manner, and a fishing line 16 is attached in any convenient manner to the pole, while the opposite end is secured to a cork or bobber 17. A second line 18 is suitably secured to the lower end of the bobber 17 and extends around a pulley or guide 19 supported on the bottom wall of the tank 13 by a bracket 20. The line 18 then extends over a second pulley or guide 21 which may be journaled in alined openings 22 and 23 in the partition 12 and front wall of the housing 11, respectively. The line then extends over pulley or guide 24 carried by a bracket 25 secured to the upper wall of the housing 11 and terminates in a swivel 26. A second swivel 27 is attached to the swivel 26 and supports a hollow cone or funnel-like element 28.

A fan or other air moving unit 29 preferably driven by an electric motor 30 is mounted to the bottom wall of the housing 11, and a plurality of horizontally disposed air holes 31 and 32 extend along the side walls adjacent the upper and lower ends thereof. As perhaps best shown in Figure 4, the cone 28 is mounted off center with respect to the fan 29 to provide an irregular upward and downward movement to the cone, as will hereinafter be more fully set forth.

In operation, the funnel or cone 28 will normally assume the position shown in the full lines in Figure 4 and upon activation of the fan 29 the air current therefrom will cause the cone 28 to move upwardly and downwardly in irregular motions. When the funnel swings directly over the fan 29, the funnel, of course, will be elevated, thus giving slack to the line 18 whereby the cork or bobber 17 will likewise be raised. When the funnel swings away from the fan 29 and downward, the slack will be taken up and thus the cork 17 will be pulled downward into the water in the tank 13. It is thought clear that no definite and regular movement will be imparted to the cone and, as a consequence, the cork or bobber will move at irregular time intervals which, of course, adds materially to the realistic effect of the display, and it is possible that the cork 17 will bob upwardly and downwardly, then the movement will be completely arrested for a short period and thereafter the cork may be pulled under the water for a short period and then remain stationary for a time. In other words, one has the definite impression that a real fish is striking at the line.

Experience has demonstrated that the weight of the funnel 28 and size of the bobber 17 must be such that without air current in the housing 11, the weight of the funnel per se will pull the cork 17 almost completely under the surface of the water in the tank and yet the funnel must be sufficiently light enough to be blown upwardly when it swings directly over the fan 29. The funnel 28 is preferably fabricated of a paper product such as heavy manila paper and the housing 11 is desirably made of sheet metal, although other types of materials may be employed with results.

The above described construction has been found to impart movements to the cork 17 which are almost identical to the movements caused by the bite of numerous small fish and seldom are any movements of the cork 17 similar. This irregular movement is what imparts such a realistic simulation and proves the efficacy of the invention, so far as display purposes are concerned.

I claim:

1. In a display device of the character described, a body of liquid, a support adapted to extend to a point above said body of liquid, a line carried by said support, a float attached to said line and adapted to be pulled under the surface of the liquid, a second line attached to said float, a hollow cone-like element carried by the free end of said second mentioned line, and power operated means below and off-center with respect to the hollow cone-like element adapted to direct a current of air upward against said hollow cone-like element whereby the float will be drawn under the liquid surface at irregular intervals, the weight of said float and hollow cone-like element being such that the hollow cone-like element will move said float a substantial distance under the surface of the liquid when not subjected to air currents.

2. In a display device of the character described, a body of liquid, a support adapted to extend to a point above said body of liquid, a line carried by said support, a float attached to said line and adapted to be pulled under the surface of the liquid, a second line attached to said float, a housing located adjacent said body of liquid, guide means within said housing for the second named line, a cone-like element within said housing and supported by the free end of said second named line, and an air moving device located in said housing at a point below said cone-like element adapted to direct air currents against said cone-like element whereby said float will be pulled under the surface of said liquid at irregular intervals.

3. A display device as claimed in claim 2, wherein said cone-shaped element is of such weight as to pull said float a substantial distance below the surface of said liquid when said air moving device is inoperative.

4. A display device as claimed in claim 2, wherein said cone-like element is mounted off center with respect to said air moving device.

5. In a display device wherein realistic movements are imparted to the object being displayed, a supporting surface for the object, a housing, an air moving device within said housing, a hollow cone-like element supported within the housing above and off-center with respect to the air moving device whereby the air currents emanating from the air moving device imparts irregular movements to the hollow cone-like element, and means connecting the hollow cone-like element with the object whereby the movements of the lightweight element will be imparted to the object.

6. In a display device wherein realistic movements are imparted to the object being displayed, a supporting surface for the object, a housing located at a point remote from the said object, a hollow cone-like element movably supported within said housing operatively connected with the said object, means camouflaging the operative connection between the hollow cone-like element and the object, and an air moving device within said housing below and off center with respect to the hollow cone-like element whereby the air currents emanating from the air moving device will impart irregular movements to the hollow cone-like element and to the object being displayed.

7. In a display device of the character described, a body of liquid, a support adapted to extend to a point above the body of liquid, a line carried by the support, a float attached to the line and adapted to be pulled under the surface of the liquid, a hollow cone-like element operatively connected with the line, and a power operated air moving device located below and off-center with respect to the hollow cone-like element whereby the air currents emanating from the air moving device will impart irregular movements to the hollow cone-like element and to the float.

8. In a display device wherein realistic movements are imparted to an object being displayed, a housing located at a point remote from the object, a power driven fan within the housing, a guide in the housing above and off-center with respect to the fan, a line freely movable over the guide, means connecting one end of the line with the object, a hollow cone-like element within the housing, a connection between the hollow cone-like element and the other end of the line so that the air currents emanating from the fan will impart irregular movements to the cone-like element and to the object being displayed by means of the line connecting the hollow cone-like element with the object.

JOHN CLARENCE BURRIS.

REFERENCES CITED

The following references are of record in the file of this patent:

UNITED STATES PATENTS

| Number | Name | Date |
| --- | --- | --- |
| 1,820,250 | Roberts, Jr., et al. | Aug. 25, 1931 |

FOREIGN PATENTS

| Number | Country | Date |
| --- | --- | --- |
| 533,984 | France | Mar. 15, 1922 |